April 5, 1966 K. H. EASTERDAY 3,243,890
WIND MACHINE FOR DRYING CROPS
Filed Oct. 10, 1963 2 Sheets-Sheet 1
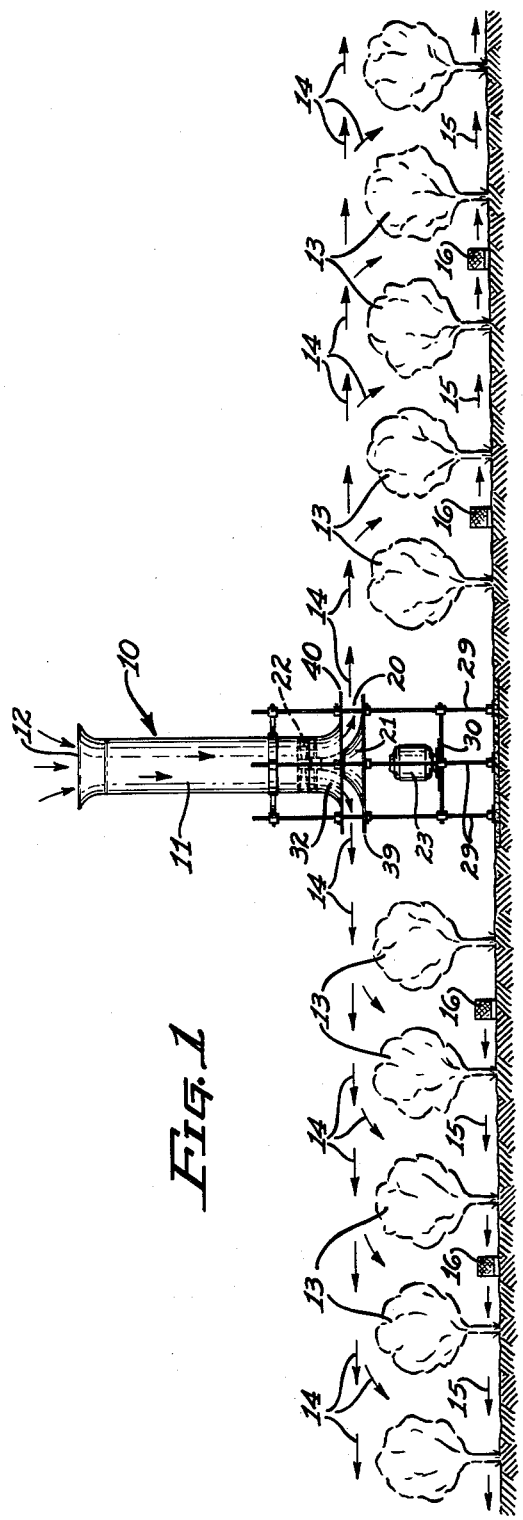
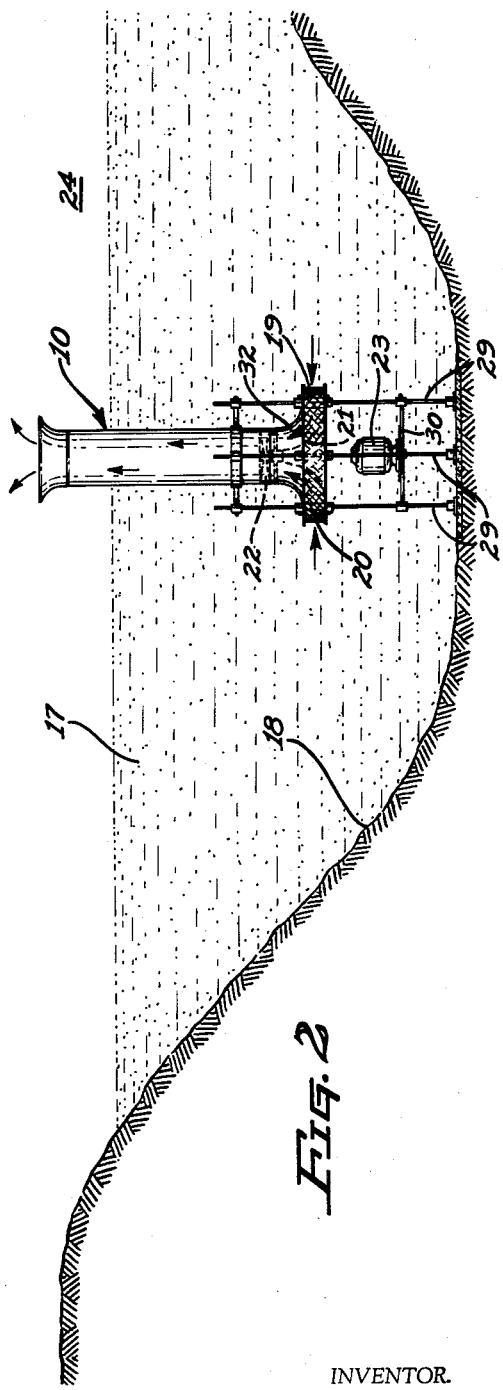
INVENTOR.
KENNETH H. EASTERDAY.
BY
ATTORNEY.

April 5, 1966 K. H. EASTERDAY 3,243,890
WIND MACHINE FOR DRYING CROPS
Filed Oct. 10, 1963 2 Sheets-Sheet 2
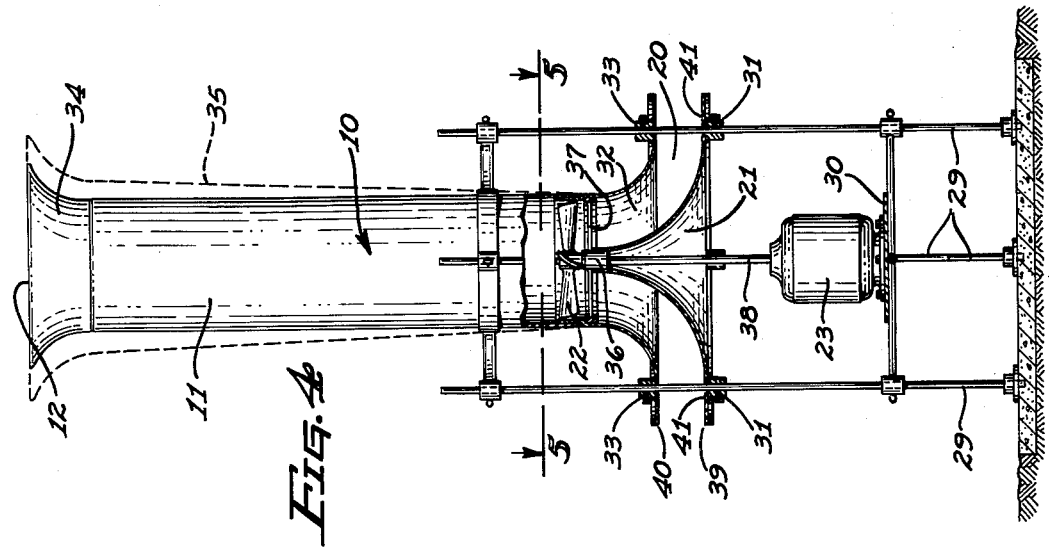
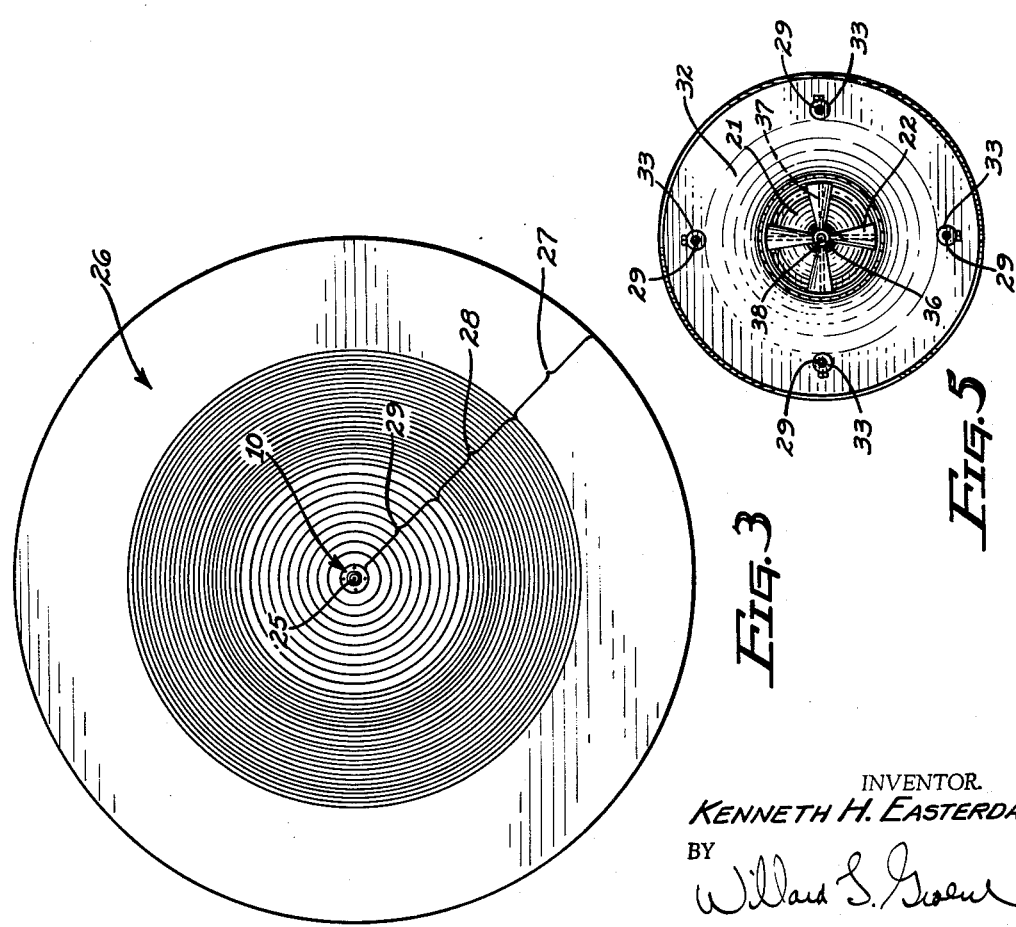
INVENTOR.
KENNETH H. EASTERDAY.
BY
ATTORNEY.

United States Patent Office 3,243,890
Patented Apr. 5, 1966

3,243,890
WIND MACHINE FOR DRYING CROPS
Kenneth H. Easterday, 560 20th St., Yuma, Ariz.
Filed Oct. 10, 1963, Ser. No. 315,159
1 Claim. (Cl. 34—33)

This invention relates to wind machines of the general type to be used minimizing frost damage, drying forage crops, alleviating fog and smog conditions and the like.

One of the objects of this invention is to develop a new process for forage crops which would be superior to that one which is commonly referred to as a dehydrating plant where forages are cut green and artificially dried in a huge rotating oven type of arrangement.

The dehydrating plant is weak because of the initial high cost of the equipment, the fuel costs for drying, and the location being stationary and unable to justify the costs because the crop acreage which it takes more often than not has to come from too great a distance and thereby adding measureably to the processing costs from the tons of water which must be transported. Further, if the cropping pattern changes often there is not enough hay to keep the plant producing. These plant facilities are usually constructed in an alfalfa growing area and never have been accepted for use on other forage crops. In the dehydration process the terrific heat which is generated often-times burns the bud, and tender leaves to a point where they are nothing but charcoal and the most nutritive part of the alfalfa plant is then lost.

Another object is to replace the costly machinery, and the costly operation of such machinery by capturing and using the heat that is generated by the sun. By using a paving material and taking advantage of a paving material that would be the right color (black) to absorb and store the heat from the sun provides another benefit of having a dry place for the forage crop to dry instead of moist or wet field conditions. In case of rain if the crop has been cut and left in the field to dry very often the crop is completely destroyed, and still has to be removed from the field to insure quality of the next crop, and it often makes the succeeding hay crop of poor quality. Many individual experiments took the form of cutting alfalfa with various tools, and placing of samples upon a paved area and watching and evaluating the results. Different results were obtained from placing some of the samples in an exposed area where the natural movement of air had ample opportunity to air in the curing of the hay samples while other samples were placed in a sheltered spot to observe the curing of the sample without the aid of air circulation. The combination of the paved area and the circulation of air gives amazing results even with other feedstuffs and forage crops such as sudan grass hay, beet top hay, hegira at silage stage, bermuda grass hay, combination alfalfa and barley hay, combination alfalfa and oat hay, cull cantaloupes which had been liquified in a blender.

Wind machines heretofore used are comprised of a stand approximately 30 to 35 feet in height, which has a propeller mounted at the upper end for moving air horizontally or laterally while the propeller rotates in a 360-degree circle furnishing air movement approximately every four minutes to the different points of the compass. This type of wind machine for drying purposes is highly unsatisfactory because the force of the air is concentrated in one area and the resultant force would move the drying forage crop into uncontrolled piles of forage which would not allow for the even drying which is desired and necessary.

Another object is to provide an even source of air circulation which would furnish the desired control to all points of the compass in a continuous manner.

In apparatus presently in use the problems of drying hay in different localities is economically unsound from the difficulty created by low lying bodies of fog which did not lift early enough in the day to allow the sun (at this time there is very little air circulation) to do more curing than the amount of moisture which had been deposited on the hay the night before. By extending the tube upward through the fog layer there would be two problems solved at one time. The furnishing of dry air for curing of a forage crop and the dry air dispelling the fog in this area of paving so that the sun could shine through and aid in the curing. This would also allow more hours of sun heat to be absorbed into the paving. This captured heat source lasts far into the night, and gradually cools off as morning approaches. Often the stored heat energy is still there when the warming trend starts again the following day.

A further object is to provide a wind machine capable of dispelling low lying fog cover and to the removal of smog bodies in certain areas and conditions.

Another object is to eliminate many equipment problems associated with hay in field conditions and to find simple solution in this new process.

It is also an object to process many thousands of tons of forage with this method which otherwise would have been forced into silage pits every year because of drying problems, and a need to get them removed from the field.

An object is also to provide means of furnishing an air circulation to a cotton crop that will be an aid in the fruiting of the cotton plant so as to overcome the strong tendency of the cotton plants to drop small bolls and squares when the humidity begins to rise in southwestern cotton desert growing areas.

And a still further object is to control the production of alfalfa seed which is strongly affected by the humidity of the air, and by furnishing an air circulation of drier air with its cooling by evaporation to greatly aid in the production of alfalfa seed, plus being very beneficial as a pollinator.

Further features and advantages of this invention will appear from a detailed description of the drawings in which:

FIG. 1 is an elevation of the wind machine set up in a grove of trees.

FIG. 2 is an elevation of the wind machine set up as a smog control device.

FIG. 3 is a plan view of a circular paved area for crop treatment.

FIG. 4 is an enlarged vertical diametrical section through the wind machine.

FIG. 5 is an enlarged section on the line 5—5 of FIG. 4.

As an example of one embodiment of this invention, there is shown, FIG. 1, a wind machine indicated generally at 10 which is arranged to draw air downwardly through the vertical tube 11 from the intake opening 12 at the top of the tube 11 and discharge air laterally over the top of the trees 13. The laterally discharged air movement indicated by the arrows 14 over the tops of the trees 13 creates an outward drift under the trees indicated by the arrows 15 where artificial heating units 16 may be placed at any interval throughout the orchard so as to be of maximum benefit.

In FIG. 2 is shown the wind machine 10 set of as a smog control device to alleviate a smog condition 17 which is trapped in a basin 18. The wind machine is located in the lower part of trapping basin 18 and a filter 19 of self cleaning type may be installed circumferentially around the bottom inlet 20 of the lower flared part 21 of the machine. The blower fan 22 is driven by a suitable motor 23 so as to in this instance discharge air upwardly through the tube 11.

The filter can be designed to be self cleaning and the machine can be designed to automatically start and stop.

The machine is readily adapted to new building construction or attached to buildings which are presently in the trouble areas and the machine can be self supporting in other areas. Without filters the machine can exhaust the polluted air upward through the tube to where a moving air stream can carry the polluted air out of the area.

The machine can be used with the fan 22 installed to pull the air downward. In this installation the tube 11 would reach into the upper area above the smog condition and pull air downward and exhaust it into the smog polluted air 17 and cause an air movement and mixing of clean air 24 with polluted air, which would gradually relieve the smog condition. The machine can be used in many outdoor installations where the humidity is very high and a gentle breeze would be beneficial for human comfort.

FIG. 3 shows a paved area (either concrete or asphalt paving), for example, which may be 660 feet in diameter. It may be of larger diameter or smaller diameter. The area has a wind machine 10 placed in the center 25 for the purpose of furnishing a drying air for a forage crop which has been placed on the paved area 26 for drying.

This area as laid out has many advantages for the forage crop process-machinery such as continuous feeding of the machinery, smooth working conditions, pay loads, and machinery could be used on this paved area, which heretofore has been confined to stationary operations, or the forage crop can be gathered with a large collecting piece of machinery resembling a huge fork for removal of the forage crop to the area where a stationary processing plant is located.

The wind machine tube 11 is extended upward to a determined point, depending on the locality. Its purpose is to create a continuous movement of air over the entire area. The air is to enter at the top 12 of the wind machine tube 11 and be drawn downward through the tube 11 by means of a blower fan 22 which is powered by a motor 23. The flared bottom 21 of the wind machine will direct the air outward in a full circle for a continuous drying of the forage crop which has been placed on the paved area 26. The purpose for having the air drawn from above is to take advantage of the layer of air which is of a lower humidity, and therefore will dry the hay faster. This is particularly important at night.

Area 27 represents the area which has had shredded and lacerated or crimped forage deposited on it for drying. In this operation the forage crop to be dried is spread very uniformly where the heat from the sun has warmed the pavement to a relatively high temperature. As the forage crop dries, the moisture is blown away by the wind machine 10 until it has reached a certain moisture content.

Area 28 with its concentric circles approximately 18 to 24 inches apart represents the second step in the drying process. After drying to the certain moisture content as explained in Area 27 the forage crop is completely turned by multiple wheel rakes mounted on a powered vehicle to form small windrows approximately 1 foot in diameter and leaving 1 foot of bared pavement in between where the machinery wheels can operate and continue to store heat from the sun. These formed windrows are to be very fluffy to allow good air circulation through the formed windrow. The crop is then dried further in this position, until the moisture content is reduced to a point just above that desired for final processing.

Area 29 with its concentric circles approximately, but not limited to every 10 feet, represents the third step, where the forage crop is raked into larger windrows for final fluffing and curing. The forage crop is then ready for its final processing into desired form. It could be further stated that in the final step in Area 29 that the forage crop could be raked for 40 feet from each side to form a large windrow if desired.

The detailed structure of the wind machine 10 is particularly shown in FIG. 4. The machine 10 as a whole is supported on a plurality of vertically disposed legs 29 to the lower portions of which is mounted the motor plate 30 carrying the motor 23. The lower flared part 21 is adjustably mounted by suitable clamp devices 31 which may be secured at desired vertical positions on the supporting legs 29. The upper flared hood 32 is mounted by suitable clamp devices 33 on the supporting legs 29.

The vertical air conductor tube 11 extends upwardly from the upper flared hood 32 to the required height and preferably has an inverted bell top 34 for smoother air flow. In certain instances it may be desirable to provide divergently upwardly extending sides 35, shown in broken lines, for more efficient air flow and quiet operation. The blower 22 is suitably supported in a bearing 36 in a spider bracket 37 located in the lower end of the tube 11 and adjacent the top connected portion of the upper flared hood 32. A suitable drive shaft 38 is interconnected between the drive motor 23 and the blower fan 22.

It is important to note that the clamp devices 31 may be independently vertically adjusted and positioned to the same or different heights so as to adjust the size and circumferential distribution of air from the opening 20 between outer lips 39 and 40 respectively of the lower flared part 21 and the upper flared hood 32. By this arrangement an excess of air discharge 14 can be had in one quadrant and a lesser air distribution at other quadrants of air discharge so as to meet special wind movements and unequal areas to be covered by the wind machine. Preferably, the top surface 41 of the lower flared part 21 should be flattened out so as to give a substantially horizontal trajectory to the air stream 14.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claim is intended to be included.

Having thus fully set forth and described this invention what is claimed and desired to be obtained by United States Letters Patent is:

A process of treating forage crops comprising:
(a) spreading and distributing the crop to be treated over a circular ground area,
(b) drawing air from a high strata of warmer dryer air well above said spread-out crop,
(c) simultaneously discharging said air radially horizontally in a complete 360° circle over the spread-out crop from the center of said circular area,
(d) and raking and fluffing said crop on said circular area during said radial horizontal circulation over said crop to dry and dehumidify the same.

References Cited by the Examiner
UNITED STATES PATENTS
2,807,120    9/1957    Graham _____ 47—2

JOHN J. CAMBY, *Acting Primary Examiner.*